United States Patent
Goodwin, III

(10) Patent No.: US 6,397,199 B1
(45) Date of Patent: May 28, 2002

(54) SYSTEM AND METHOD OF ALTERING TRANSACTION TERMS BASED UPON CURRENT INVENTORY LEVELS

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/144,294

(22) Filed: Aug. 31, 1998

(51) Int. Cl.$^7$ .................................................. G06F 17/60
(52) U.S. Cl. ........................ 705/400; 705/22; 235/383
(58) Field of Search ........................... 705/400, 20, 21, 705/22, 28, 26; 235/383

(56) References Cited

U.S. PATENT DOCUMENTS

| | | | |
|---|---|---|---|
| 3,637,989 A | | 1/1972 | Howard et al. ............. 235/383 |
| 4,002,886 A | | 1/1977 | Sundelin ................ 235/61.7 R |
| 4,500,880 A | | 2/1985 | Gomersall et al. ..... 340/825.35 |
| 4,766,295 A | * | 8/1988 | Davis et al. ................. 705/400 |
| 4,924,363 A | | 5/1990 | Kornelson ................... 362/125 |
| 5,172,314 A | | 12/1992 | Poland et al. ............... 364/401 |
| 5,448,226 A | | 9/1995 | Failing, Jr. et al. ..... 340/825.35 |
| 5,765,143 A | * | 6/1998 | Sheldon et al. ............... 705/22 |
| 5,774,868 A | | 6/1998 | Cragun et al. ................. 705/10 |
| 5,933,813 A | * | 8/1999 | Teicher et al. ................. 705/26 |
| 5,946,662 A | * | 9/1999 | Ettl et al. ........................ 705/8 |
| 5,960,414 A | * | 9/1999 | Rand et al. .................... 705/28 |
| 6,044,358 A | * | 3/2000 | Goodwin, III ............... 705/20 |
| 6,105,004 A | * | 8/2000 | Halperin et al. .............. 705/22 |

FOREIGN PATENT DOCUMENTS

| | | |
|---|---|---|
| EP | 0 712 086 A2 * | 5/1996 |
| EP | 0749082 | 12/1996 |
| EP | 0 764 913 A2 * | 3/1997 |
| WO | 9009638 | 8/1990 |
| WO | 9632683 | 10/1996 |
| WO | WO 9632683 * | 10/1996 |

OTHER PUBLICATIONS no author; "NCR Wireless Price Management Solution Automates Shelf Pricing at K–VA–T Food City"; Aug. 1998; PR Newswire, p820CLTH002; DialogWeb copy pp. 1–3.*

\* cited by examiner

*Primary Examiner*—James P. Trammell
*Assistant Examiner*—Thomas A. Dixon
(74) *Attorney, Agent, or Firm*—Paul W. Martin

(57) ABSTRACT

A system and method of altering transaction terms which examines inventory levels and changes transaction terms, such as price and rental period. The system includes a plurality of electronic price labels associated with a plurality of rental items for displaying rental terms of the rental items including price information and rental period information, a storage medium containing a plurality of threshold inventory ranges and a plurality of prices associated with the inventory ranges and a plurality of rental periods associated with the inventory ranges, and a computer which determines first inventory levels for the rental items and first inventory ranges from the current inventory levels at first rental terms including first prices and first rental periods and which determines second inventory levels and second threshold inventory ranges from the second inventory levels for the rental items and whether to replace the first prices with second prices and the first rental periods with second rental periods if the second inventory ranges differ from the first inventory ranges, and which sends a message to the electronic price labels to display second rental terms including the second prices and the second rental periods.

4 Claims, 3 Drawing Sheets

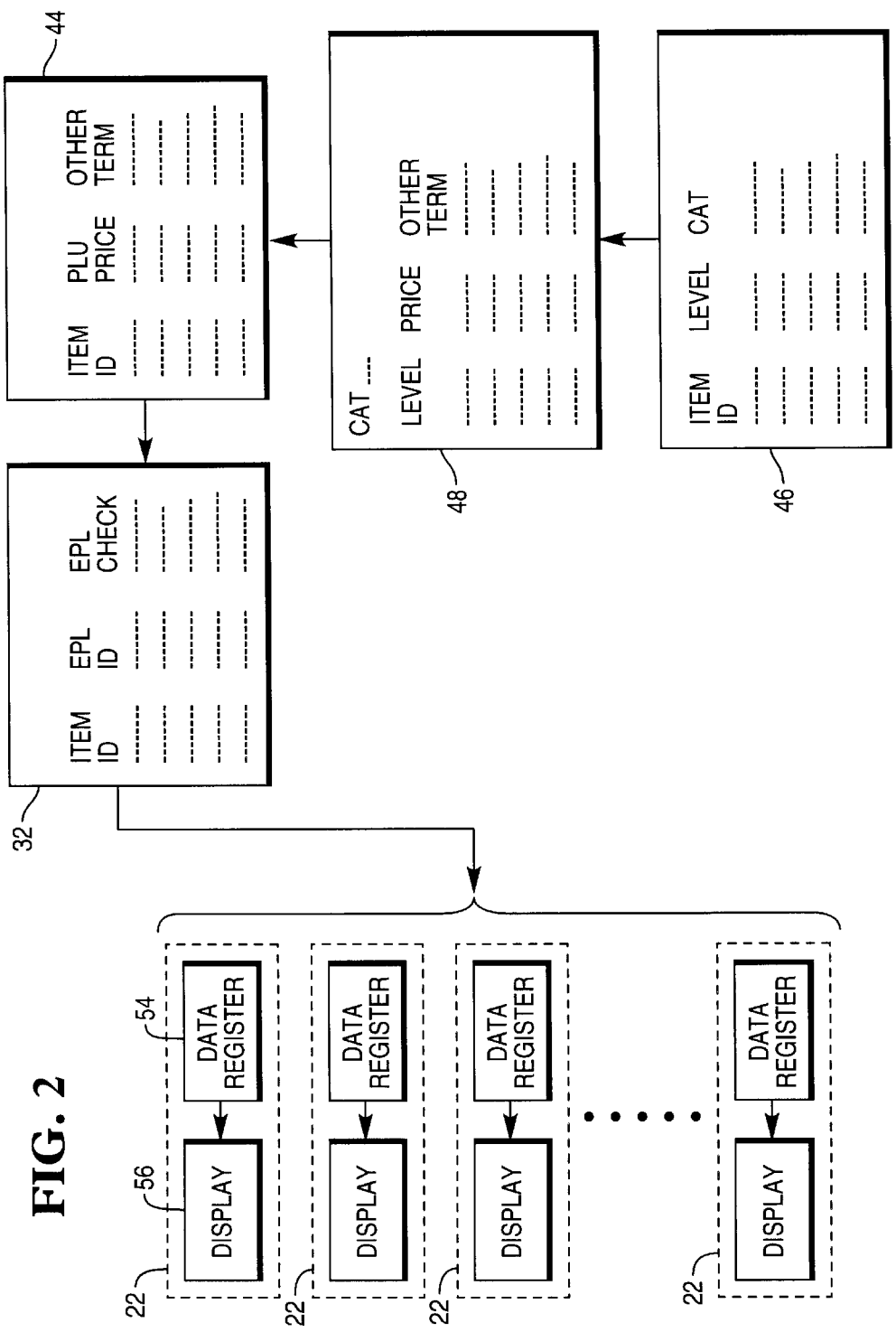

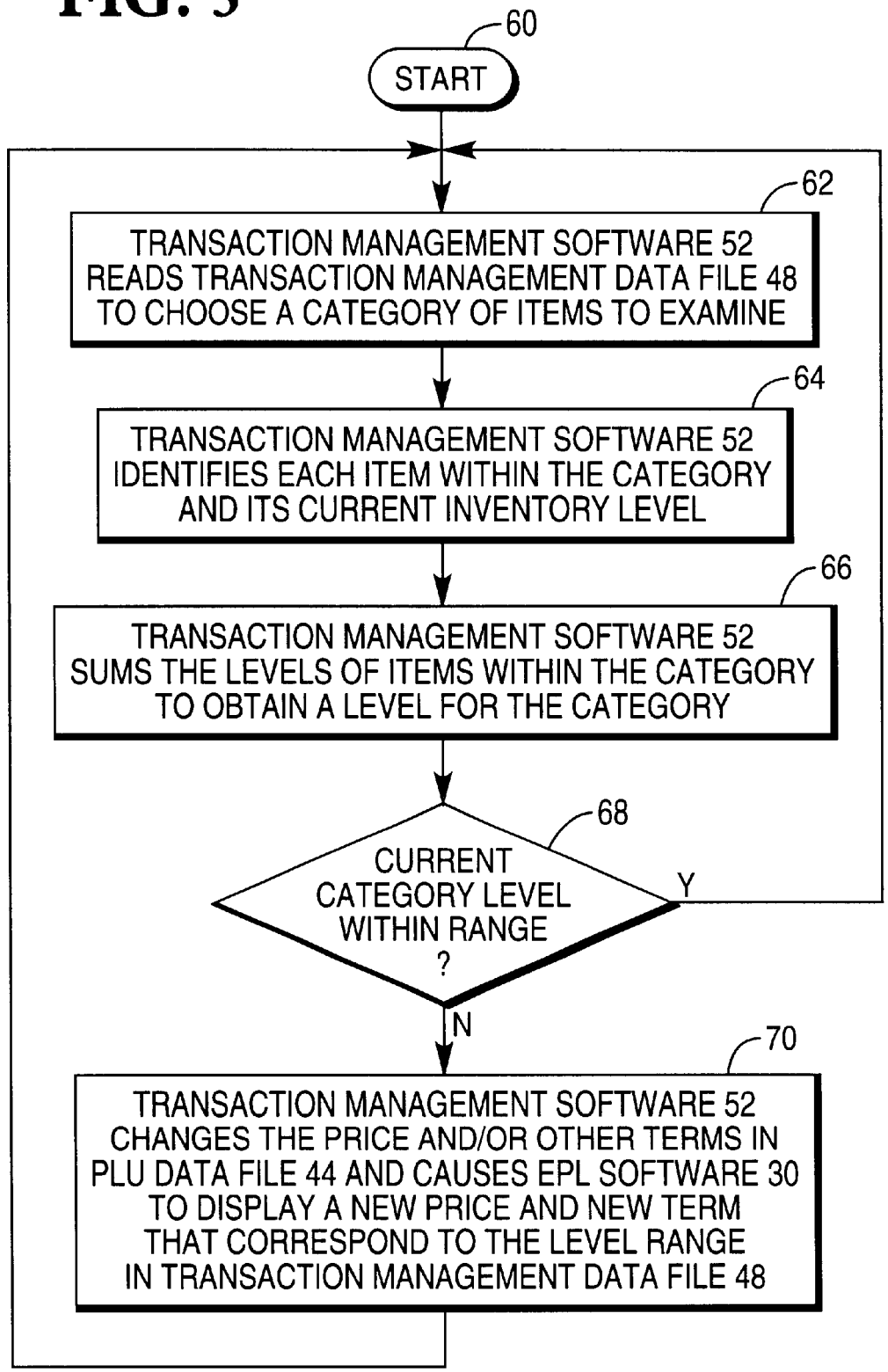

SYSTEM AND METHOD OF ALTERING TRANSACTION TERMS BASED UPON CURRENT INVENTORY LEVELS

BACKGROUND OF THE INVENTION

The present invention relates to transaction processing systems, and more specifically to a system and method of altering transaction terms based upon current inventory levels.

Point-of-sale (POS) transaction processing systems typically include a price look-up (PLU) file which contains item identification information and item price information. They also typically include an inventory file which is updated with each rental or purchase.

In some retail establishments, there is a need to sell or rent under different pricing strategies based upon inventory levels. For example, a video rental establishment may have various rental terms for various categories of video rentals. New movies may be single day rentals at one price. Older releases may be week long rentals at a second price. Children's videos may be rented for yet a different period of time at a different price.

However, as inventory levels change, there is a need to change the price or rental period. If the inventory level of one category of video is low, then the retailer may wish to shorten the rental period or increase the rental price. If the inventory level is high, the retailer may wish to lengthen the rental period or decrease the rental price.

Constantly implementing changes in rental terms throughout the video rental establishment would be difficult, since signs would have to be posted and changed for each change in rental terms.

Therefore, it would be desirable to provide a system and method of altering transaction terms which can display current transaction rental terms in real time.

SUMMARY OF THE INVENTION

In accordance with the teachings of the present invention, a system and method of altering transaction terms based upon current inventory levels is provided.

The system includes a plurality of electronic price labels associated with a plurality of rental items for displaying rental terms of the rental items including price information and rental period information, a storage medium containing a plurality of threshold inventory ranges and a plurality of prices associated with the inventory ranges and a plurality of rental periods associated with the inventory ranges, and a computer which determines first inventory levels for the rental items and first inventory ranges from the current inventory levels at first rental terms including first prices and first rental periods and which determines second inventory levels and second threshold inventory ranges from the second inventory levels for the rental items and which whether to replace the first prices with second prices and the first rental periods with second rental periods if the second inventory ranges differ from the first inventory ranges, and which sends a message to the electronic price labels to display second rental terms including the second prices and the second rental periods.

The method includes the steps of establishing a plurality of different transaction terms for the item at a plurality of different threshold inventory levels, determining a first inventory level and a first threshold inventory level associated with the first inventory level and a first transaction term for the item from the first threshold inventory level, determining a second inventory level and second threshold inventory level for the item, and comparing the first and second threshold inventory levels. If the e first and second threshold inventory levels are different, the method further includes the steps of determining a second transaction term for the item from the second threshold inventory level and replacing the first transaction term with the second transaction term, and displaying the second term by an electronic price label associated with the item.

It is accordingly an object of the present invention to provide a system and method of altering transaction terms based upon current inventory levels.

It i s another object of the present invention to provide a system and method of altering transaction terms based upon current inventory levels w which does not require additional labor costs.

It is another object of the present invention to provide a system and method of altering transaction terms based upon current inventory levels which employs an EPL system to display the new transaction terms.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a diagram showing data files used within a transaction establishment; and FIG. 3 is a flow diagram illustrating the method of the present invention.

DETAILED DESCRIPTION OF THE PREFERRED EMBODIMENT

Figure 1:
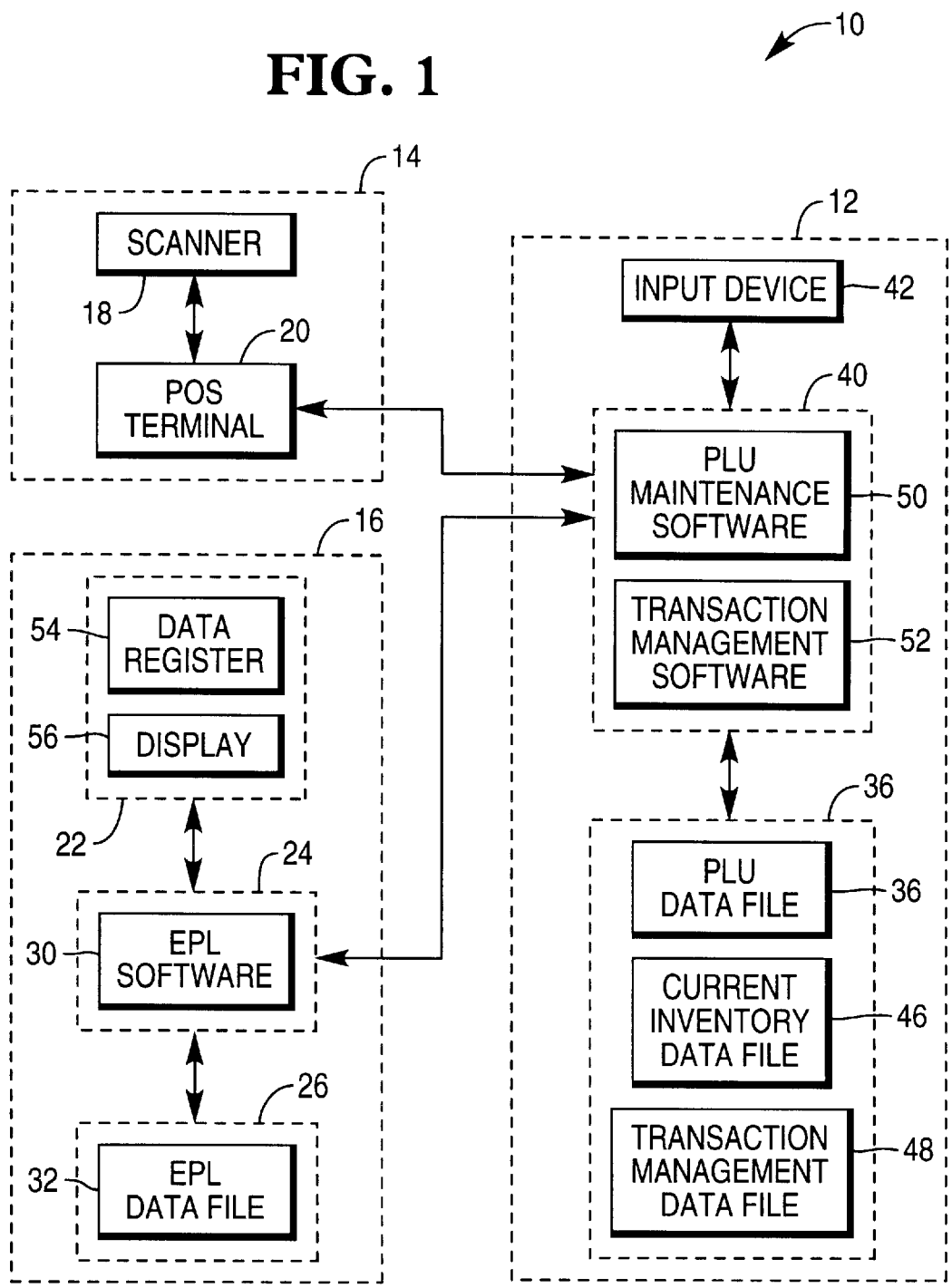
FIG. 1 is a block diagram of a transaction processing system.

Referring now to FIG. 1, transaction system 10 primarily includes host computer system 12, point-of-sale (POS) system 14, and electronic price label (EPL) system 16. Here, components 12, 14, and 16 are shown as separate components that are networked together, but they may also form a single component in small transaction establishments, such as video rental establishments.

POS system 14 includes bar code reader 18 and terminal 20.

EPL system 16 primarily includes EPLs 22, host EPL terminal 24, and EPL storage medium 26.

EPLs 22 include a data register 54 and a display 56. Data registers 54 contain data, usually price and product data, sent from EPL software 30. In the case of a video rental establishment, product data includes inventory data, such as current return date. The data is typically displayed by displays 56.

Host EPL terminal 24 executes EPL software. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting price data to EPLs 22. EPL software 30 obtains prices in price look-up (PLU) data file 44 as they are entered in input device 42 (immediate processing) or after they have been stored within PLU data file 44. EPL software 30 also schedules and transmits product information, including inventory information and promotional information, to EPLs 22 for display.

EPL storage medium 26 stores EPL data file 32 and is preferably a fixed disk drive. EPL data file 32 contains item identification, EPL identification, and price checksum information. Price checksum information is calculated from price information in PLU data file 44.

Host computer system 12 includes Storage medium 36, host PLU terminal 40, and input device 42.

Host PLU terminal 40 executes PLU maintenance software 50 and transaction management software 52.

PLU maintenance software 50 updates PLU data file 44 upon operator input.

Transaction management software 52 monitors current inventory levels and prices in PLU data file 44 and automatically alters current transaction terms based upon a predefined schedule in transaction management data file 48.

In the video rental establishment example, transaction management software 52 automatically monitors video inventory levels and establishes a new return date or price for each category of video from transaction management data file 48. Transaction management software 52 updates prices and return dates in PLU data file 44 and causes EPL software 30 to display a new price and return date.

Input device 42 is preferably a keyboard.

Storage medium 36 stores PLU data file 44, current inventory data file 46, and transaction management data file 48.

PLU data file 44 includes item identification information and item price information. In a video transaction establishment, PLU data file 44 may additionally contain a current return date. PLU data file 44 is available for distribution to POS terminal 20. Alternatively, provision may be made for direct access to PLU data file 44 by bar code reader 18.

Current inventory data file 46 contains a count of each item in the transaction establishment.

Transaction management data file 48 contains a table of inventory levels, prices, and transaction terms for each category of goods. In the video rental establishment example, transaction management data file 48 includes return date information for each video category.

The number of inventory levels in the table is determined by the type of business. For example, in one business many levels may be employed, while in another business only two levels separated by a single threshold level may be employed. The latter scheme may be optimal for managing different categories of video rentals.

Turning now to FIG. 2, EPL data file 32, PLU data file 44, current inventory data file 46, and transaction management data file 48 are shown in more detail.

EPL data file 32 includes a line entry for each EPL 22 in EPL system 16. Each line entry has an item identification entry (ITEM ID), an EPL identification entry (EPL ID), and an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by display 56.

PLU data file 44 includes a line entry for each item sold in the store. Each line entry has an item identification entry (ITEM ID) and a PLU price entry (PLU PRICE). Each item may additionally include a data field for another term or terms of the transaction. For example, rental return date would be an additional transaction term that could be stored in PLU data file 44 and managed with price data.

Entry ITEM ID identifies a store item. Entry PLU PRICE identifies the price read by POS system 14 to determine the price of each item during scanning by bar code reader 18. Entry OTHER TERM identifies an additional transaction term.

Current inventory data file 46 includes a line entry for each item (ITEM ID), its current inventory level (LEVEL), and the category it belongs to (CAT).

Transaction management data file 48 includes threshold inventory levels for each category of items (CAT). Each category of items includes a line entry for threshold inventory levels (LEVEL), prices within each range of threshold inventory levels (PRICE), and other transaction terms (OTHER TERM) for each range of threshold inventory levels. An example of another transaction term would be the return date for a video rental.

During normal operation, transaction management software 52 automatically monitors current inventory data file 46 and compares category levels to threshold levels in transaction management data file 48. As different threshold levels are reached, transaction management software 52 changes price and other term information in PLU data file 44 and causes EPL software 30 to display a new price and/or term.

Turning now to FIG. 3, the operation of daily price change management software 28 is discussed in more detail beginning with START 60.

In step 62, transaction management software 52 reads transaction management data file 48 to choose a category of items to examine. Individual items may also be examined instead of categories.

In step 64, transaction management software 52 identifies each item within the category and its current inventory level. Current inventory data file 46 is automatically updated by POS terminal 20 during each transaction.

In step 66, transaction management software 52 sums the levels of items within the category to obtain a current level for the category.

In step 68, transaction management software 52 compares the category level to threshold levels in transaction management data file 48.

If current price and other terms are at a current category level which is within the corresponding range of category levels in transaction management data file 48, then operation proceeds to step 62.

If current price and other terms are at a current category level which is outside of the corresponding range of category levels in transaction management data file 48, then operation continues in step 70 in which transaction management software 52 changes the price and/or other terms in PLU data file 44 and causes EPL software 30 to display a new price and new term that correspond to the level range in transaction management data file 48.

In step 72, operation returns to step 62 to examine another category of goods.

Advantageously, use of EPLs 22 allows the transaction establishment to quickly display the new price and terms. As inventory levels change, the price and other terms may be quickly changed without the time and cost to change such information manually throughout the transaction establishment. For the video rental example, if the inventory level of one category of video is low, then the retailer may quickly shorten the rental period and/or increase the rental price for each video in the category. If the inventory level is high, the retailer may quickly lengthen the rental period and/or decrease the rental price.

Transaction management software 52 may be executed continuously, after hours, or on demand, depending on the type of business. Operation loops back from steps 68 and 70 to step 62.

Although the present invention has been described with particular reference to certain preferred embodiments thereof, variations and modifications of the present invention can be effected within the spirit and scope of the following claims.

I claim:

1. A method of determining a transaction term for an item comprising the steps of:

establishing a plurality of different transaction terms for the item at a plurality of different threshold inventory levels;

determining a first inventory level, a first threshold inventory level associated with the first inventory level, and a first transaction term for the item from the first threshold inventory level;

determining a second inventory level and second threshold inventory level for the item;

comparing the first and second threshold inventory levels;

if the first and second threshold inventory levels are different, determining a second transaction term for the item from the second threshold inventory level and replacing the first transaction term with the second transaction term; and displaying the second term by an electronic price label associated with the item.

2. A method of determining a transaction term for a rental item comprising the steps of:

establishing a plurality of different transaction terms including a plurality of different prices and a plurality of different rental periods for the rental item at a plurality of different threshold inventory ranges;

determining a first inventory level, a first threshold inventory range containing the first inventory level, and a first price and first rental period for the rental item from the first threshold inventory range;

determining a second inventory level and second threshold inventory range containing the second inventory level for the rental item;

comparing the first and second threshold inventory ranges;

if the first threshold inventory range is higher than the second threshold inventory range, determining alternative second transaction terms for the rental item including a second price higher than the first price and a second rental period shorter than the first rental period; or if the first threshold inventory range is less than the second threshold inventory range, determining alternative second transaction terms for the rental item including a second price lower than the first price and a second rental period longer than the first rental period; and displaying one of the alternative second transaction terms by an electronic price label associated with the rental item.

3. A method of determining a rental period for a rental item comprising the steps of:

establishing a plurality of different rental periods for the rental item at a plurality of different threshold inventory ranges;

determining a first inventory level, a first threshold inventory range containing the first inventory level, and a first rental period for the rental item from the first threshold inventory range;

determining a second inventory level and second threshold inventory range containing the second inventory level for the rental item;

comparing the first and second threshold inventory ranges;

determining a second rental period, which is longer than the first rental period for the rental item if the first threshold inventory range is higher than the second threshold inventory range, and which is shorter than the first rental period if the first threshold inventory range is less than the second threshold inventory range; and displaying the second rental period by an electronic rental period label associated with the rental item.

4. An electronic price label system comprising:

a plurality of electronic price labels associated with a plurality of rental items for displaying rental terms of the rental items including price information and rental period information;

a storage medium containing a plurality of threshold inventory ranges, a plurality of prices associated with the inventory ranges, and a plurality of rental periods associated with the inventory ranges; and a computer which determines first inventory levels for the rental items and first inventory ranges from the current inventory levels at first rental terms including first prices and first rental periods, and which determines second inventory levels and second threshold inventory ranges from the second inventory levels for the rental items, and whether to replace the first prices with second prices and the first rental periods with second rental periods if the second inventory ranges differ from the first inventory ranges, and which sends a message to the electronic price labels to display second rental terms including the second prices and the second rental periods.

* * * * *